C. H. CLARK.
TAGS.

No. 178,908.  Patented June 20, 1876.

Witnesses:
Theodore Hoster
Fred. G. Bond

Inventor:
Charles H. Clark
By B. C. Clark,
his Attorney.

N. PETERS, PHOTO-LITHOGRAPHER, WASHINGTON, D. C.

UNITED STATES PATENT OFFICE.

CHARLES H. CLARK, OF NEW YORK, N. Y.

IMPROVEMENT IN TAGS.

Specification forming part of Letters Patent No. 178,908, dated June 20, 1876; application filed April 19, 1876.

*To all whom it may concern:*

Be it known that I, CHARLES H. CLARK, of the city of New York, county and State of New York, have invented a new article of manufacture, the same being what I call a Tag, of which the following is a specification, reference being had to the drawings hereto annexed, forming part of the same, in which—

Figure 1:
Figure 2:
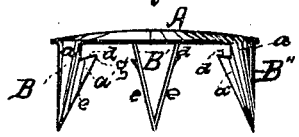
Figure 3:
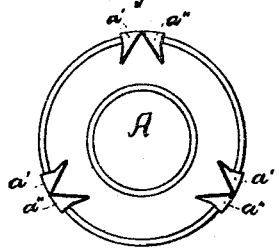

Figure 1 represents a top view of my invention; Fig. 2, a side view of the same; Fig. 3, a view of the under part of the same.

My invention, as a new article of manufacture, relates to and consists of a "tag," as I call it, formed of a disk or flat piece of tin or other metal, constructed with projections or "trowel-shaped teeth," as I call them, extending at right angles with the surface of the disk or piece of metal, the upper parts of the sides of which are cut away, leaving an open space, which serves, when once the teeth are pushed into the substance or material to which it is desired to affix the label, as an obstruction to its removal.

I form my tag by cutting a disk or piece of tin or metal into the required shape or size by means of suitably-constructed punches or dies, with two or more (in the drawing I have shown three) teeth or legs projecting at right angles to said disk. These teeth are cut out and form one piece with the disk or metal. The teeth are shaped like a trowel by bending their sides inward, the lower end of which, being cut narrower than the upper part, and the sides brought closer together, form a sharp point, easily penetrating any substance against which it is pressed. The upper portion for a distance has the sides wider, till, within a short distance of the main piece, the sides are cut entirely away, leaving an exposed edge or abutment, against and on which the substance in which the teeth are fastened rests, holding said teeth, and the disk with it, in position.

In the drawings, A represents the disk or surface of metal of the required size, having on its sides or edge, cut with it, and forming one piece bent at right angles to the surface, the teeth B B' B'', to which is given a trowel shape by bending the sides $a'$ $a''$ inward. The end farthest from the disk is pointed by bending these sides close together, which sides are separated wider apart as they extend upward, till, within a short distance from the main piece A, I remove the sides, leaving only the piece $a$ and the exposed edge $d$ $d$, as an abutment, on which the material rests, as said above. The sides $a$ $a'$, left with their rough tin surface, are naturally sharp, and serve to cut the material through which they pass, till the point $g$ is reached, when, there being no obstruction, the material or substance expands out, and rests upon the edges $d$ $d'$, thus fixing the teeth in position.

The outer portion of the teeth being round, and of a smooth surface, passes readily, and with but little resistance, through the material to which the tag is to be attached.

What I claim is—

As a new article of manufacture, a tag formed of the disk A, the same being formed of one piece of metal, having teeth or prongs B, the edges of which are curved inward, the upper part of which is cut away, leaving the narrow space $a$, for the purposes as shown and described.

Witness my hand this 17th day of April, 1876.

CHAS. H. CLARK.

Witnesses:
G. G. TAYLOR,
THEODORE HOSTER.